US012664766B2

(12) United States Patent (10) Patent No.: US 12,664,766 B2
Sinthong et al. (45) Date of Patent: Jun. 23, 2026

(54) HYPERPARAMETER OPTIMIZATION

(71) Applicant: INTERNATIONAL BUSINESS MACHINES CORPORATION, Armonk, NY (US)

(72) Inventors: Phanwadee Sinthong, White Plains, NY (US); Nam H. Nguyen, Pleasantville, NJ (US); Arindam Jati, Bengaluru (IN); Vijay Ekambaram, Chennai (IN); Jayant R. Kalagnanam, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 18/507,046

(22) Filed: Nov. 11, 2023

(65) Prior Publication Data

US 2025/0157198 A1 May 15, 2025

(51) Int. Cl.
*G06V 10/774* (2022.01)
*G06V 10/764* (2022.01)

(52) U.S. Cl.
CPC ........ *G06V 10/7747* (2022.01); *G06V 10/764* (2022.01)

(58) Field of Classification Search
CPC .......................... G06V 10/7747; G06V 10/764
See application file for complete search history.

(56) References Cited

U.S. PATENT DOCUMENTS

| | | | |
|---|---|---|---|
| 11,381,470 B2 | 7/2022 | Purohit | |
| 11,562,252 B2 | 1/2023 | Walters | |
| 2020/0035224 A1* | 1/2020 | Ward | .................. G06N 3/0455 |
| 2022/0261598 A1 | 8/2022 | Chen | |
| 2022/0327058 A1 | 10/2022 | Vu | |

OTHER PUBLICATIONS

Bischl, B. et al., "Hyperparameter Optimization: Foundations, Algorithms, Best Practices and Open Challenges", arXiv:2107.05847v3 [stat.ML] (2021), 70 pgs.
Feurer, M. et al., "Hyperparameter Optimization", Chapter 1, In Automated Machine Learning, F. Hutter, et al. Eds., the Springer Series On Challenges in Machine Learning (2019), 31 Pgs.

(Continued)

*Primary Examiner* — David F Dunphy
(74) *Attorney, Agent, or Firm* — CHIP LAW GROUP

(57) ABSTRACT

A computer product and methodology is provided for supplying data domain datasets in machine training trials. A parameter code is decoded in a computer request for a training trial. The parameter code identifies a next dataset in a set of sample data stored in a first computer memory. The product and methodology further searches to determine whether the next dataset is available in a second computer memory. If the searching determines the next dataset is available in the second memory, then in response to the computer request for a training trial the next dataset that is available in the second memory is supplied. If, on the other hand, the searching determines the next dataset is not available in the second memory, then in response to the computer request for a training trial the next dataset sampled and preprocessed from the set of sample data is supplied.

19 Claims, 9 Drawing Sheets

(56)                    References Cited

OTHER PUBLICATIONS

Morales-Hernandez, A., et al., "A Survey On Multi-Objective Hyperparameter Optimization Algorithms for Machine Learning", arXiv:2111.13755v3 [cs.LG] (2022), 71 Pgs.

Authors (Disclosed Anonymously), "Minimizing the Hash Node/Bucket Allocations and Hash Operations While Searching Different Fields Across Different Hash Tables", IP.com No. IPCOM000255766D (2018), 6 Pgs.

Authors (Disclosed Anonymously), "System and Method for Implementing Multi-Dimension Hive Bucketing", IP.com No. IPCOM000263785D (2020), 4 Pgs.

Authors (Disclosed Anonymously), A Method To Schedule Jobs With a Data-Context-Aware Standby Service in Edge Computing:, IP.com No. IPCOM000268943D (2022), 12 Pgs.

Tokopedia, P. T. et al., "Message Queue Consumer Resiliency With Distributed Leaky-Bucket Rate Limiter and Multi-Channel", IP.com No. IPCOM000272821D (2023), 7 Pgs.

Li, L. et al. "A system for massively parallel hyperparameter tuning", Proceedings of Machine Learning and Systems 2 (2020): 230-246.

Li, Y. et al. "Hyper-tune: towards efficient hyper-parameter tuning at scale", Proceedings of the VLDB Endowment 15.6 (2022): 1256-1265.

Shin, A., et al. "Hippo: sharing computations in hyper-parameter optimization", Proceedings of the VLDB Endowment 15.5 (2022): 1038-1052.

Falkner, S. et al., "BOHB: Robust and efficient hyperparameter optimization at scale", In International Conference on Machine Learning, PMLR (2018), pp. 1437-1446.

Yang, L. et al.; "On Hyperparameter Optimization of Machine Learning Algorithms: Theory and Practice", arXiv:2007.15745v3 [cs.LG] (2022), 70 Pgs.

Yu, P. et al., "Salus: Fine-grained GPU sharing primitives for deep learning applications", Proceedings of Machine Learning and Systems 2 (2020): 98-111.

* cited by examiner

100

224

| | 228 | 214 | 226 |
|---|---|---|---|
| MEM | | | |
| 1 | Dataset$_{i1}$ | {512, 10, 1} |
| ⋮ | ⋮ | ⋮ |
| 8 | Dataset$_{i8}$ | {512, 10, 1} |
| 9 | Dataset$_{j1}$ | {512, 10, 5} |
| 10 | Dataset$_{j2}$ | {512, 10, 5} |
| 11 | Dataset$_{j3}$ | {512, 10, 5} |
| 12 | Dataset$_{k1}$ | {256, 10, 5} |
| ⋮ | ⋮ | ⋮ |
| 18 | Dataset$_{k7}$ | {256, 10, 5} |

FIG. 5

HYPERPARAMETER OPTIMIZATION

BACKGROUND

The present disclosure generally relates to machine learning, and more particularly but not by way of limitation, to computer devices and methods that improve machine learning by reusing data domain datasets in machine training trials.

SUMMARY

According to an embodiment of the present disclosure, a computer-implemented method is provided for supplying data domain datasets in machine training trials. The method includes decoding a parameter code in a computer request for a training trial. The parameter code identifies a next dataset in a set of sample data stored in a first computer memory. The method further includes searching to determine whether the next dataset is available in a second computer memory. If the searching determines the next dataset is available in the second memory, then in response to the computer request for a training trial the next dataset that is available in the second memory is supplied. If, on the other hand, the searching determines the next dataset is not available in the second memory, then in response to the computer request for a training trial the next dataset sampled and preprocessed from the set of sample data is supplied.

In one embodiment, which may be combined with the preceding embodiment, a computer program product is provided for supplying data domain datasets in machine training trials. The computer program product includes a computer readable storage medium having program instructions embodied therewith. An execution of the program instructions by a processor causes a computing device to decode a parameter code in a computer request for a training trial. The parameter code identifies a next dataset in a set of sample data stored in a first computer memory. The method searches to determine whether the next dataset is available in a second computer memory. If the search determines the next dataset is available in the second memory, then in response to the computer request for a training trial the next dataset that is available in the second memory is supplied. However, if the search determines the next dataset is not available in the second memory, then in response to the computer request for a training trial the next dataset sampled and preprocessed from the set of sample data is supplied.

In one embodiment, a computer system is provided for supplying data domain datasets in machine training trials. The computer system includes a processor, a computer-readable memory, a computer-readable tangible storage device, and program instructions stored on the computer-readable storage device for execution by a processor via the computer-readable memory. The computer system is configured to optimize machine learning by decoding a parameter code in a computer request for a training trial. The parameter code identifies a next dataset in a set of sample data stored in a first computer memory. The method further searches to determine whether the next dataset is available in a second computer memory. If the search determines the next dataset is available in the second memory, then in response to the computer request for a training trial the next dataset that is available in the second memory is supplied. However, if the searching determines the next dataset is not available in the second memory, then in response to the computer request for a training trial the sampled and pre-processed next dataset from the set of sample data is supplied.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 5 diagrammatically depicts encoding and buffering datasets for supplying them to parallel training trials, consistent with illustrative embodiments.

DETAILED DESCRIPTION

Figure 1:
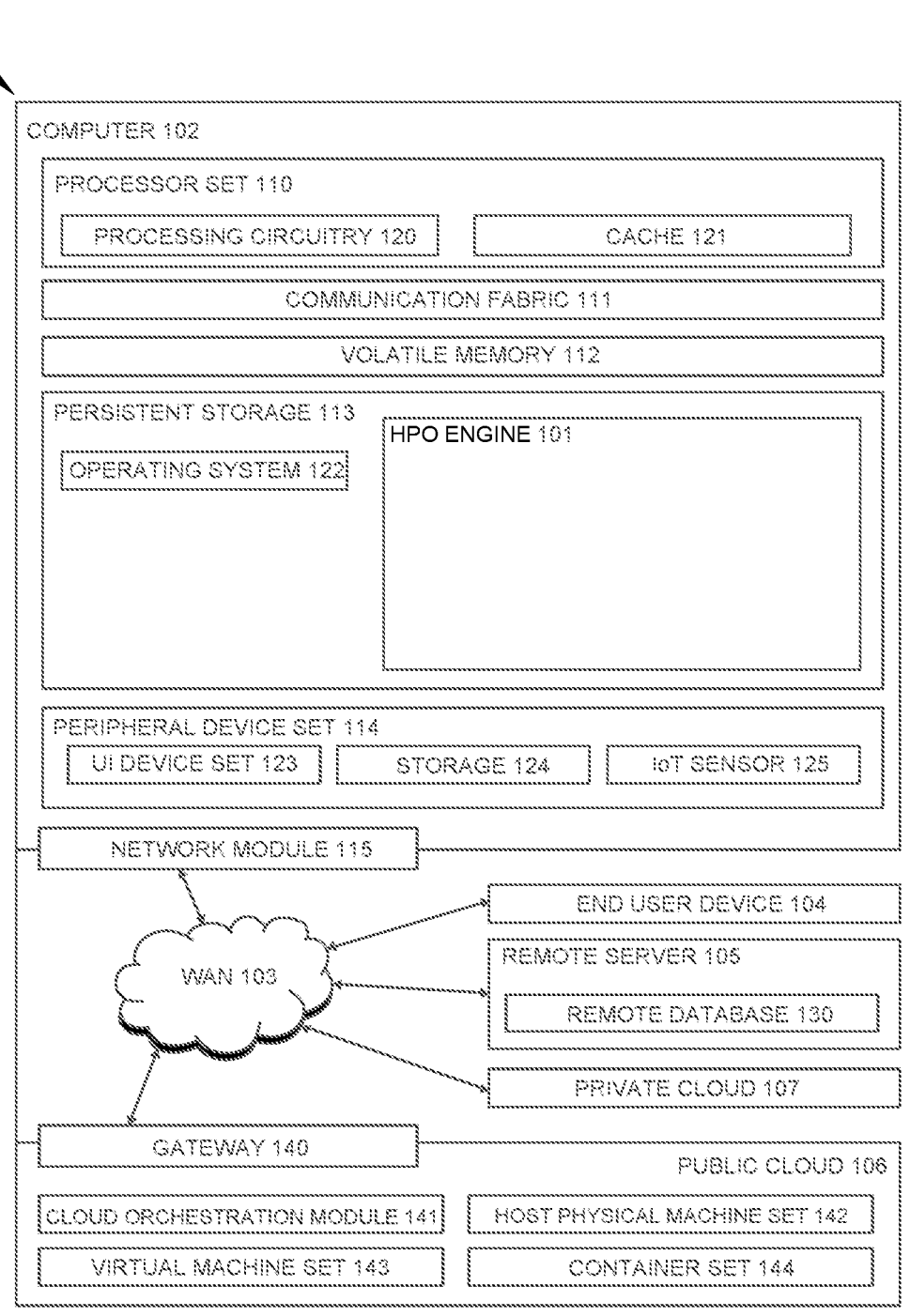
FIG. 1 is a functional block diagram of a computer hardware platform for efficient and reliable hyperparameter optimization, consistent with illustrative embodiments.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

According to an aspect of the present disclosure, there is provided a computer-implemented method for supplying data domain datasets in machine training trials. The computer-implemented method includes decoding a parameter code in a computer request for a training trial, to identify a next dataset in a set of sample data stored in a first computer memory. The computer-implemented method further includes responding to the computer request for a training trial by determining if the next dataset is available in a second computer memory. Upon determining that the next dataset is available in the second computer memory, then the next dataset that is available in the second computer memory is supplied for the requested training trial. Upon determining that the next dataset is not available in the second computer memory, then the next dataset from the set of sample data is supplied for the requested training trial. This reduces computer processing overhead by reducing the number of datasets supplied from the set of sample data, and reduces computer storage requirements by reducing redundant copies of the next dataset.

In some embodiments, the parameter code corresponds to one or more predetermined data domain hyperparameter values of the next dataset. This directly corresponds the parameter code to the dataset.

In some embodiments, the one or more data domain hyperparameter values comprise at least one data domain hyperparameter value comprising a window size, a patch length, or a stride. This directly corresponds the parameter code to the dataset.

In some embodiments, the computer-implemented method includes encoding the next dataset sampled from the set of sample data with the parameter code, and storing the encoded next dataset to the second computer memory. This makes the encoded dataset available via the second computer memory.

In some embodiments, the sampling and preprocessing steps include extracting the next dataset from the set of sample data stored in the first computer memory, transforming the next dataset into a training sample for performing a training trial, and loading the next dataset with other scheduled datasets into a predetermined order of training trials. This configures the dataset in the set of sample data for running a training trial on a ML model.

In some embodiments, the transforming includes at least one computer process comprising resizing images, decoding videos, or data augmentation. This configures the dataset in the set of sample data for running a training trial on a ML model.

In some embodiments, the transforming includes batching together domain features and labels of the next dataset. This configures the dataset in the set of sample data for running a training trial on a ML model.

In some embodiments, the second computer memory is shared between a central processing node and a multiprocessing node to perform parallel training trials in the predetermined order. This improves processing throughput by multiprocessing parallel training trials and by sharing datasets between the central processing node and the multiprocessing node.

In some embodiments, the predetermined order runs parallel training trials in the multiprocessing node with all datasets corresponding to a same parameter code to optimize a similarity of the datasets in the multiprocessing node. This minimizes validation loss in the ML model while maximizing the similarity of all datasets in the multiprocessing node.

In some embodiments, the predetermined order runs parallel training trials in the multiprocessing node with datasets having different parameter codes to optimize a utilization of the multiprocessing node. This maximizes the utilization of the multiprocessing node.

In some embodiments, computer-implemented method includes the second computer memory is shared between the central processing node and a plurality of multiprocessing nodes. The predetermined order runs parallel training trials with all datasets having a same parameter code in at least one of the plurality of multiprocessing nodes. The predetermined order runs parallel training trials with datasets having different parameter codes in at least one of the plurality of multiprocessing nodes. This balances optimizing the similarity of all datasets in the plurality of multiprocessing nodes with optimizing the utilization of the plurality of multiprocessing nodes.

In some embodiments, the computer-implemented further includes selectively deleting the next dataset from the second computer memory. This optimizes computer memory utilization.

According to an aspect of the disclosure, there is provided a computer program product for supplying data domain datasets in machine training trials. The computer program product includes a computer readable storage medium having program instructions embodied therewith. An execution of the program instructions by a computer processor causes a computing device to decode a parameter code in a computer request for a training trial, to identify a next dataset in a set of sample data stored in a first computer memory. The computer-implemented method further includes responding to the computer request for a training trial by determining if the next dataset is available in a second computer memory. Upon determining that the next dataset is available in the second computer memory, then the next dataset that is available in the second computer memory is supplied for the requested training trial. Upon determining that the next dataset is not available in the second computer memory, then the next dataset from the set of sample data is supplied to the requested training trial. This reduces computer processing overhead by reducing the number of datasets supplied from the set of sample data, and reduces computer storage requirements by reducing redundant copies of the next dataset.

In some embodiments, the execution of the program instructions further causes the computing device to encode the next dataset sampled from the set of sample data with the parameter code, and store the encoded next dataset to the second computer memory. This makes the encoded dataset available via the second computer memory.

In some embodiments, the execution of the program instructions further causes the computing device to share the second computer memory between a central processing node and a multiprocessing node to perform parallel training trials in a predetermined order. This improves processing throughput by multiprocessing parallel training trials and by sharing datasets between the central processing node and the multiprocessing node.

In some embodiments, the execution of the program instructions further causes the computing device run parallel training trials in the multiprocessing node with all datasets having a same parameter code according to the predetermined order to optimize a similarity of the datasets in the multiprocessing node. This minimizes validation loss in the ML model while maximizing the similarity of all datasets in the multiprocessing node.

In some embodiments, the execution of the program instructions further causes the computing device to run parallel training trails in the multiprocessing node with datasets having different parameter codes according to the predetermined order to optimize a utilization of the multi-processing node. This maximizes the utilization of the multiprocessing node.

In some embodiments, the execution of the program instructions further causes the computing device to share the second computer memory between the central processing node and a plurality of multiprocessing nodes. The predetermined order runs parallel training trials all with datasets having a same parameter code to optimize a similarity of the datasets in at least one of the multiprocessing nodes. The predetermined order runs parallel training trials with datasets having different parameter codes to optimize a utilization of at least one of the multiprocessing nodes. This balances optimizing the similarity of all datasets in the plurality of multiprocessing nodes with optimizing the utilization of the plurality of multiprocessing nodes.

In some embodiments, the execution of the program instructions further causes the computing device to selectively delete the next dataset from the second computer memory. This optimizes computer memory utilization.

According to an aspect of the disclosure, there is provided a computer system for supplying data domain datasets in machine training trials. The computer system has a processor, a computer-readable memory, a computer-readable tangible storage device, and program instructions stored on the computer-readable storage device for execution by a processor via the computer-readable memory. The computer system is configured to perform a method, including decoding a parameter code in a computer request for a training trial, to identify a next dataset in a set of sample data stored in a first computer memory. The method further includes responding to the computer request for a training trial by determining if the next dataset is available in a second computer memory. Upon determining that the next dataset is available in the second computer memory, then the next dataset that is available in the second computer memory is supplied for the requested training trial. Upon determining that the next dataset is not available in the second computer memory, then the next dataset from the set of sample data is supplied for the requested training trial. This reduces computer processing overhead by reducing the number of datasets supplied from the set of sample data, and reduces computer storage requirements by reducing redundant copies of the next dataset.

Machine learning ("ML"), and more generally artificial intelligence ("AI"), involves the development and use of computing systems that are configured to learn from data without need of explicit programming instructions. This science employs algorithms and statistics to analyze and inference from data values and patterns. ML constructs mathematical models ("ML models") that can make predictions about current and future events based on training data obtained from historical events.

ML techniques generally fall into the categories of supervised learning, unsupervised learning, and reinforcement learning. Supervised learning aims to learn an input-output mapping function from a labeled dataset. Supervised learning can be grouped into classification models, regression models, and instance models.

Classification modeling refers to determining the classes (or categories) to which various data outputs belong. Classification can be employed when the outputs are restricted to a limited set of quantifiable values. Labels are assigned to the output values, and ML models are trained to predict the most probable output label from training data. Classification models can include, for example, linear classifiers, k-nearest neighbor (kNN), decision trees, random forests, support vector machines (SVMs), Bayesian classifiers, and convolutional neural networks.

Regression modeling (regression analysis) generally refers to estimating relationships between a dependent variable and one or more independent variables ("predictors" or "covariates" or "features"). In contrast to classification, regression does not have a discrete range of output values. Regression models can include, for example, logistic regression, linear regression, gradient descent (GD), and stochastic GD (SGD).

Instance modeling generally compares new feature values with historical feature values used in training and stored in memory. Instance models can include, for example, k-nearest neighbor, decision tree algorithms such as classification and regression tree (CART), iterative dichotomiser 3 (ID3), chi-square automatic interaction detection (CHAID), fuzzy decision tree (FDT), support vector machines (SVM), Bayesian algorithms, ensemble algorithms such as extreme gradient boosting, and random forest.

An ML "feature" is a measurable value of the system or process being analyzed via ML modeling. Features can be represented, for example, by integers, strings, variables, ordinals, real-values, and categories. A new feature can be derived from existing features. A set of features can form a "feature vector" tuple of one or more values called scalars. The vector space associated with these vectors is often called a "feature space."

Unsupervised learning aims to map a function to hidden relationships by building an ML model from a dataset including only inputs without output labels. Unsupervised learning models can find relational patterns from groupings and clusterings of data. Some examples of unsupervised learning are K-means clustering, principal component analysis (PCA), and topic modeling.

Reinforcement learning aims to optimize a long-term objective by interacting with the environment based on a trial-and-error process. RL models can include, for example, Markov decision process, Markov chain, Q-learning, multi-armed bandit learning, and deep RL.

An artificial neural network is an ML modeling platform having an arrangement of connected computing neurons (or nodes), and somewhat analogous to the arrangement and function of biological neurons in a human brain. In both cases, the neurons can transmit signals to other neurons. Connections (or edges) between the computing neurons are somewhat analogous to the synapses in the human brain. The computing neurons and edges are typically assigned individual weights, and those weights typically are adjusted during the learning process. Neurons can be configured with a threshold such that a signal is forwarded only if the upstream aggregate signal crosses the threshold. The neurons can be aggregated into layers, such that different layers perform different transformations. Signals travel from a first layer (input layer) to a last layer (output layer), by traversing hidden layers therebetween. Neural networks can include, for example, deep neural (DNN), feed forward (FNN), convolutional (CNN), deep CNN (DCN), deconvolutional (DNN), recurrent (RNN), and deep stacking network (DSN).

Machine learning can include any or all the following aspects: 1) obtaining and preprocessing a dataset; 2) selecting features; 3) selecting an ML model; 4) dividing a dataset into training data and testing data; 5) training the ML model; 6) testing the ML model; and 7) optimizing (tuning) the ML model.

ML models employ model parameters and hyperparameters. Model parameters include values, characteristics and properties that are learned during training. In other words, a model parameter can be estimated from the training dataset. Model parameters are used in computations, and their values reflect accuracy with which the ML model makes predictions. Model parameters can include, for example, weights in a neural network, support vectors in a support vector machine, and coefficients in a logistic regression. Model parameters for classification modeling can include, for example, pixelation, word frequency, and character matching.

Hyperparameters cannot be learned during the training process, instead they are selected before training the ML model. They generally determine how training datasets are configured. Hyperparameters can include, for example, sample size, shuffling, number of training iterations (epochs), learning rate (convergence rate), hidden layer arrangements, weight initializations, dropout threshold, and gradient clipping threshold.

The selected hyperparameter values can affect many aspects of ML modeling such as the training speed, training resource requirements, and learning process accuracy. Different hyperparameters can define different datasets for training the ML model. ML model performance is directly related to the selected hyperparameter values, so they can be optimized (tuned) to increase the accuracy of an ML model's predictions.

Hyperparameter values can initially be manually configured such as based on research, experience, and trial and error. Hyperparameter optimization ("HPO") techniques can then be employed aiming to minimize the ML model error throughout the hyperparameter space. This can be achieved by resampling techniques such as cross-validation. HPO approaches range from relatively less complex such as grid search and random search, to relatively more complex such as Hyperopt search and Bayesian search.

HPO can be directed individually to any predetermined goal such as, for example, reducing resource requirements, reducing prediction time, increasing prediction accuracy, and to combinations of these. For example, without limitation, HPO can be configured to minimize resource consumption over speed and accuracy considerations. HPO can determine which hyperparameter tuple yields an optimal model meeting a predefined loss function threshold.

Some HPO approaches include grid-search, random search, and Bayesian optimization. Grid-search can be used to find the optimal hyperparameters, which result in the most accurate predictions. Grid-search is a brute force technique where a search is performed on a manually specified set or subset of an hyperparameter space. The grid-search approach is comparatively expensive in terms of time and computing resource requirements. For example, for a set of one hundred hyperparameters, where each hyperparameter has one thousand possible values, and each training process takes about one hour to complete, then the HPO process would conceivably take about 100,000 hours to complete.

The random search approach involves randomly selecting a set of hyperparameters until a combination is discovered that improves the ML model performance. In general, the random search approach yields less accurate hyperparameters than the grid-search approach, which leads to a less accurate ML model. However, the random search approach can outperform grid-search when only a small number of hyperparameters significantly affects the ML model accuracy.

Bayesian optimization minimizes an objective function by building a probability model based on past evaluation results of the objective. When applied to HPO, the objective function is the validation error of an ML model using a set of hyperparameters. This approach involves iteratively evaluating a hyperparameter configuration based on a current ML model, and continually updating the probability model to concentrate on promising hyperparameters based on previous results. Bayesian optimization has been shown to obtain better results in fewer evaluations in comparison to the grid-search and random search approaches. However, evaluating the objective function is expensive in terms of resource consumption and time.

So, the term "machine learning" broadly describes a function of an electronic system that learns from data. A machine learning system, engine, or module can include using sampling datasets to run training trials on a trainable machine learning algorithm to learn functional relationships between inputs and outputs that are currently unknown.

Machine learning can be utilized to solve a variety of technical issues (e.g., learning previously unknown functional relationships) in connection with technologies such as, but not limited to, machine learning technologies, time-series data technologies, data analysis technologies, data classification technologies, data clustering technologies, trajectory/journey analysis technologies, medical device technologies, collaborative filtering technologies, recommendation system technologies, signal processing technologies, word embedding technologies, topic model technologies, image processing technologies, video processing technologies, audio processing technologies, and/or other digital technologies.

To better understand the features of the present disclosure, it may be helpful to discuss known architectures. To that end, the following detailed description illustrates various aspects of the present disclosure by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 includes an example of an environment for the execution of at least some of the computer code involved in performing the inventive methods, including a hyperparameter optimization block 101. In addition to block 101, computing environment 100 includes, for example, computer 102, wide area network (WAN) 103, end user device (EUD) 104, remote server 105, public cloud 106, and private cloud 107. In this embodiment, computer 102 includes processor set 110 (including processing circuitry 120 and cache 121), communication fabric 111, volatile memory 112, persistent storage 113 (including operating system 122 and block 101, as identified above), peripheral device set 114 (including user interface (UI) device set 123, storage 124, and Internet of Things (IoT) sensor set 125), and network module 115. Remote server 105 includes remote database 130. Public cloud 106 includes gateway 140, cloud orchestration module 141, host physical machine set 142, virtual machine set 143, and container set 144.

COMPUTER 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 102, to keep the presentation as simple as possible. Computer 102 may be located in a cloud, even though it is not shown in a cloud in FIG. 1. On the other hand, computer 102 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 102 to cause a series of operational steps to be performed by processor set 110 of computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 101 in persistent storage 113.

COMMUNICATION FABRIC 111 is the signal conduction path that allows the various components of computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 102, the volatile memory 112 is located in a single package and is internal to computer 102, but, alternatively or additionally, the volatile memory may be distributed over multiple packages and/or located externally with respect to computer 102.

PERSISTENT STORAGE 113 is any form of non-volatile storage for computers that is now known or to be developed in the future. The non-volatility of this storage means that the stored data is maintained regardless of whether power is being supplied to computer 102 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 101 typically includes at least some of the computer code involved in performing the inventive methods.

PERIPHERAL DEVICE SET 114 includes the set of peripheral devices of computer 102. Data communication connections between the peripheral devices and the other components of computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 102 is required to have a large amount of storage (for example, where computer 102 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 102 to communicate with other computers through WAN 103. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 102 from an external computer or external storage device through a network adapter card or network interface included in network module 115.

WAN 103 is any wide area network (for example, the internet) capable of communicating computer data over non-local distances by any technology for communicating computer data, now known or to be developed in the future. In some embodiments, the WAN 103 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 104 is any computer system that is used and controlled by an end user (for example, a customer of an enterprise that operates computer 102), and may take any of the forms discussed above in connection with computer 102. EUD 104 typically receives helpful and useful data from the operations of computer 102. For example, in a hypothetical case where computer 102 is designed to provide a recommendation to an end user, this recommendation would typically be communicated from network module 115 of computer 102 through WAN 103 to EUD 104. In this way, EUD 104 can display, or otherwise present, the recommendation to an end user. In some embodiments, EUD 104 may be a client device, such as thin client, heavy client, mainframe computer, desktop computer and so on.

REMOTE SERVER 105 is any computer system that serves at least some data and/or functionality to computer 102. Remote server 105 may be controlled and used by the same entity that operates computer 102. Remote server 105 represents the machine(s) that collect and store helpful and useful data for use by other computers, such as computer 102. For example, in a hypothetical case where computer

102 is designed and programmed to provide a recommendation based on historical data, then this historical data may be provided to computer 102 from remote database 130 of remote server 105.

PUBLIC CLOUD 106 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 106 is performed by the computer hardware and/or software of cloud orchestration module 141. The computing resources provided by public cloud 106 are typically implemented by virtual computing environments that run on various computers making up the computers of host physical machine set 142, which is the universe of physical computers in and/or available to public cloud 106. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 106 to communicate through WAN 103.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 107 is similar to public cloud 106, except that the computing resources are only available for use by a single enterprise. While private cloud 107 is depicted as being in communication with WAN 103, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 106 and private cloud 107 are both part of a larger hybrid cloud.

The computer 102 in some embodiments can be a computer server. The remote server 105 in some embodiments can represent multiple servers, which provide machine learning resources and/or computer memory resources for the computer 102 and the HPO block 101.

Accordingly, the computer 102 has a specialized processing unit such as the HPO block 101 and the like for carrying out computations related to optimizing machine learning. More particularly, without limitation, the specialized processing unit automatically and consistently performs hyperparameter optimization. The computer system is thereby specifically configured to provide technical improvements to data systems, machine learning systems, artificial intelligence systems, and systems of data analysis systems such as but not limited to data classification systems, data regression systems, data batching and clustering systems, and the like. The optimization can further provide one or more inferences, provide one or more predictions, and/or determine one or more relationships among the data. For example, optimization as described herein can model one or more inferences and/or predictions and/or may determine one or more relationships amongst the variables analyzed in the data. Machine learning predicts outputs, e.g., probabilities, from historical data. Such optimized machine learning helps with downstream decision making, even with such downstream decision making that is automated.

The optimization resources can employ any suitable ML based techniques, statistical-based techniques and/or probabilistic-based techniques. For example, the ML resources can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, and the like. For example, the ML resources can perform a set of clustering ML computations, a set of logistic regression ML computations, a set of decision tree ML computations, a set of random forest ML computations, a set of regression tree ML computations, a set of least square ML computations, a set of instance-based ML computations, a set of support vector regression ML computations, a set of k-means ML computations, a set of spectral clustering ML computations, Gaussian mixture model ML computations, a set of regularization ML computations, a set of rule ML computations, a set of Bayesian ML computations, a set of deep Boltzmann computations, a set of deep belief network computations, a set of convolution neural network computations, a set of stacked auto-encoder computations and/or a set of different ML computations.

Accordingly, the computing system generally facilitates optimizing machine learning in accordance with one or more embodiments illustratively described herein. For example, the optimizations can be related to high-speed parallel training trial systems, an artificial intelligence system, a collaborative filtering system, a recommendation system, a signal processing system, a word embedding system, a topic model system, an image processing system, a data analysis system, a media content system, a video-streaming service system, an audio-streaming service system, an e-commerce system, a social network system, an internet search system, an online advertisement system, a medical system, an industrial system, a manufacturing system, and/or another digital system. The system can employ hardware and/or software to solve problems that are highly technical in nature, that are not abstract and that cannot be performed as a set of mental acts by a human.

For simplicity of explanation, the specialized-computer-implemented methods are depicted and described as a series of acts. It is to be understood and appreciated that the subject innovation is not limited by the acts illustrated and/or by the order of acts. That is, for example, acts can occur in various orders and/or concurrently, and with other acts not presented and described herein. Furthermore, not all expressly disclosed acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from a computer-readable device or storage media.

The system can employ hardware and/or software to solve problems that are highly technical in nature, that are not abstract and that cannot be performed as a set of mental acts by a human. One or more embodiments of the system can also provide technical improvements to a computer processing unit associated with a ML process by improving processing performance of the computer processing unit, reducing computing bottlenecks of the computer processing unit, improving processing efficiency of the computer processing unit, and/or reducing an amount of time for the computer processing unit to perform the ML process.

Figure 2:
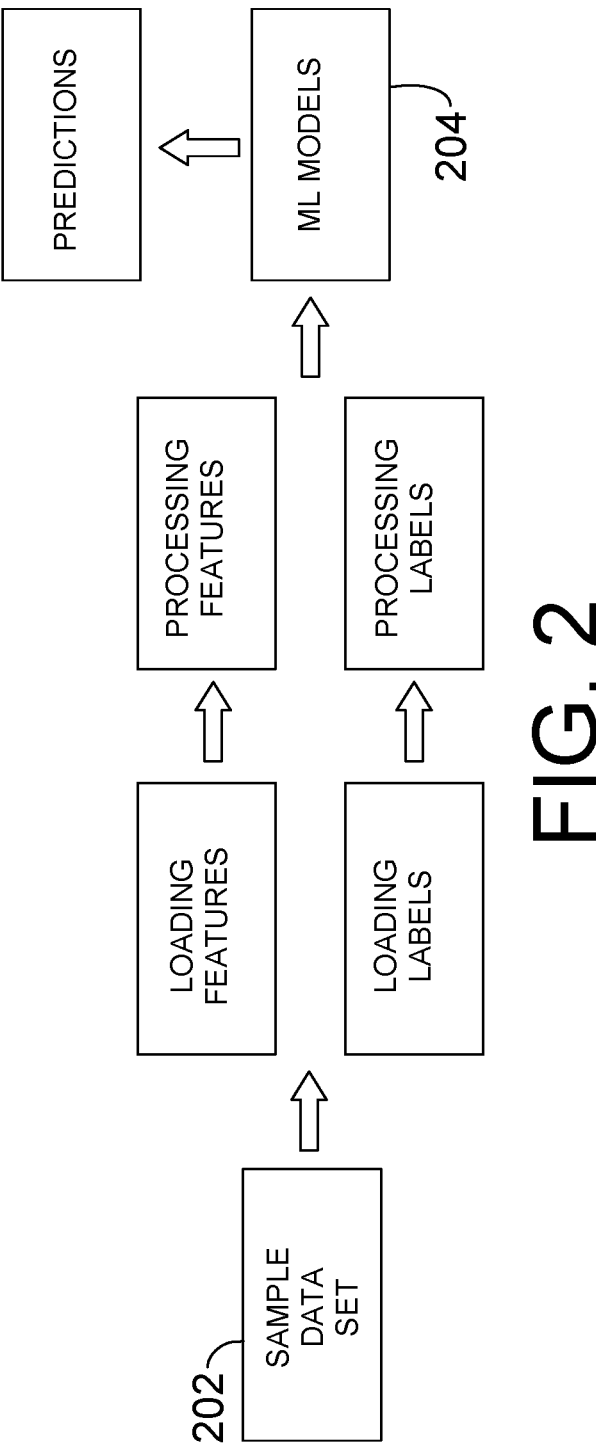
FIG. 2 is a functional block diagram of a dataloading pipeline for supplying training trials on ML models, consistent with illustrative embodiments.

In the following disclosure of illustrative embodiments, FIG. 2 depicts a data pipeline that can function on one end to extract datasets from a set of sample data 202. On the other end, the data pipeline can function to supply the datasets to high-speed parallel training trials running on many ML models. In between, the data pipeline can function to preprocess the datasets into proper form to run reliably on the ML models.

At the first end, the set of sample data 202 can be stored in the same or multiple computer memories. Extracting datasets from the set of sample data 202 can involve many formatting operations, such as joining data tables together and the like. Preprocessing the datasets can involve many transformative operations, such as resizing images, decoding videos, augmenting data, and the like. In FIG. 2, the preprocessing includes multiplexing a feature datastream and a label datastream into a unified complex datastream to the training trials. In an example in which the features in FIG. 2 include video images, the labels can be cross-ids for the images, and the like. This label processing can include transforming integer values to tensor values for performing classification modeling.

Figure 3:
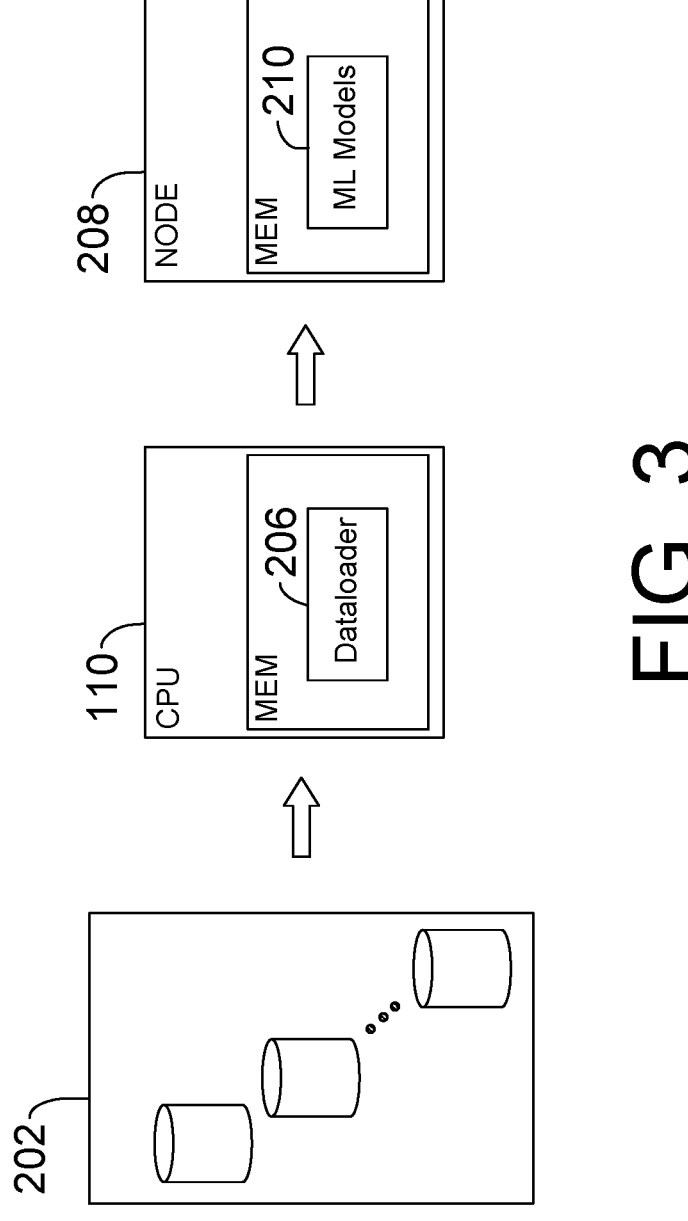
FIG. 3 depicts a dataloading pipeline having dataloader logic executed by a processor to supply datasets to training trials run on ML models, consistent with illustrative embodiments.

FIG. 3 conceptually depicts the HPO engine 101 can include a dataloader block 206 stored in computer memory ("MEM") and can be executed by the computer's processor set 110 (FIG. 1). The MEM can be internal memory such as the persistent storage 113 (FIG. 1), or external memory accessible via a remote connection such as the WAN 103. The dataloader block 206 can also be (in part or whole) in the virtual machine set 143 and/or container set 144. The dataloader block 206 can function to supply datasets from the set of sample data 202 for high-speed parallel training trials in a processing node 208 where the ML model blocks 210 can reside.

Figure 4:
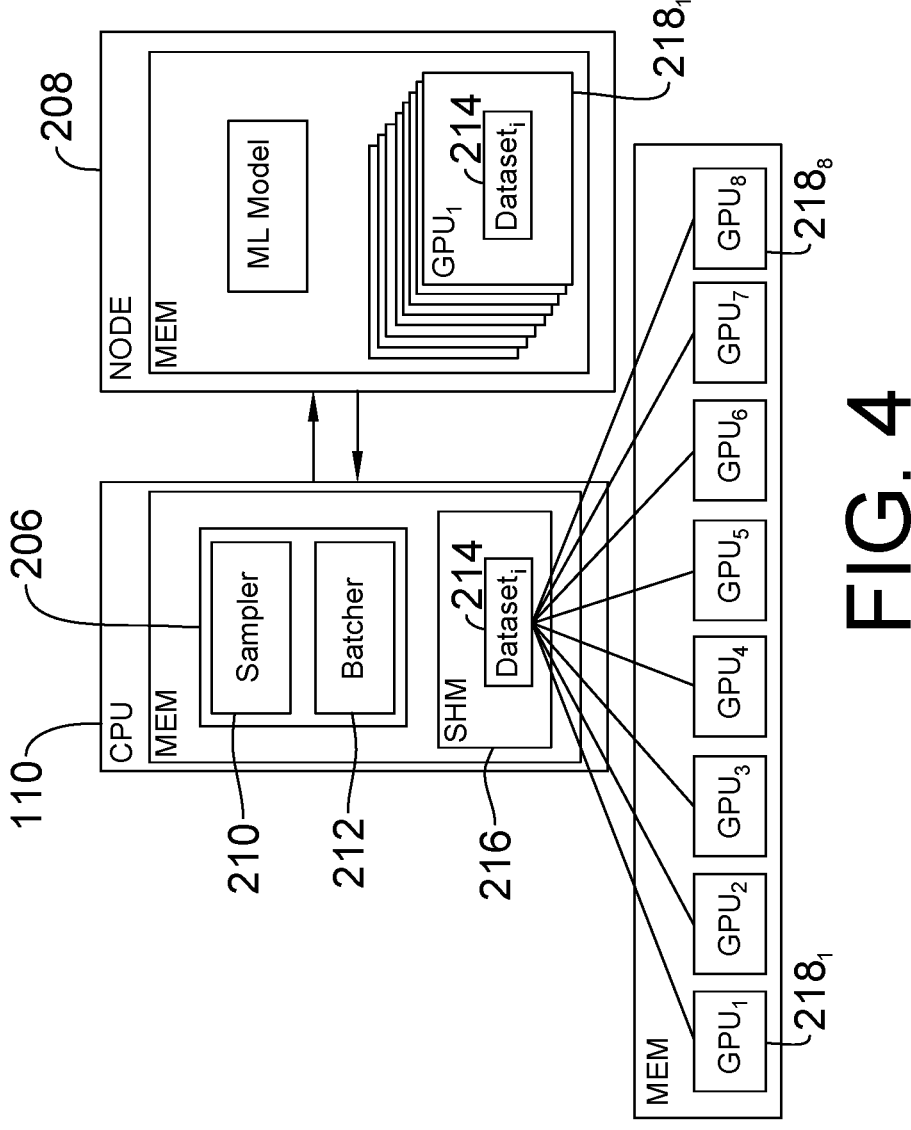
FIG. 4 depicts a dataloading pipeline with sampler logic to extract datasets from a set of sample data and with batcher logic to preprocess the datasets, and with a shared memory ("SM") for passing datasets between the processor and a multiprocessing node for performing parallel training trials on different ML models, consistent with illustrative embodiments.

FIG. 4 depicts the dataloader block 206 can include a sampler block 211 and a batcher block 212. Before extracting the next dataset from the set of sample data 202, the sampler block 211 can randomly shuffle indices of the set of sample data 202. It can respond to scheduled training trial requests by extracting the next scheduled dataset from the set of sample data 202, if need be. If the next dataset is already available otherwise, then the sampling and batching functions are not needed. Reducing this unnecessary duplicity significantly increases reliability and reduces processing overhead and memory constraints.

To determine whether the next dataset is already available otherwise, for example, FIG. 4 depicts an identifiable dataset$_i$ 214 stored in a shared memory 216. This makes the dataset$_i$ 214 available to multiple (in this example eight) graphics processing units ("GPUs") 218 in the processing node 208. FIG. 4 depicts the dataset$_i$ is also stored in the first GPU 218$_1$.

Normally, if the total number of scheduled data domain training trials is N$_d$, and the total number of scheduled model domain training trials is N$_m$, then the total number of datasets is Nd×Nm. But with individually identifiable datasets, an optimization goal can be reducing the total number of all datasets to just Nm. In that case, each dataset would be sampled and preprocessed only one time, for all the scheduled parallel training trials. Striving for that goal can significantly reduce processing overhead such as by eliminating duplicative sampling and preprocessing operations, and can at the same time increase reliability and throughput such as by streamlined provisioning of processing resources.

To individually recognize the datasets, generally, they can be encoded. One way of encoding can be to use one or more of each dataset's hyperparameter values. Some example hyperparameters can be window size, patch length, and stride. The window size defines the extents of sampling. The patch length defines a sample size. The stride defines the displacement between adjacent samplings.

So before commencing scheduled training trials, hyperparameter values can be selected for sampling (entirely or mostly) in the data domain, consistent with illustrative embodiments. Continuing the example above, two hyperparameter values {512, 256}can be selected for the window size, three hyperparameter values {10, 20, 30}can be selected for the patch length, and two hyperparameter values {1, 5}can be selected for the stride, as follows:

Window Size={512, 256}
Patch Length={10, 20, 30}
Stride={1, 5}

These predetermined hyperparameters and values can be used to construct parameter codes, in this case twelve unique tuples throughout the data domain, as follows:

dataset$_i$={512, 10, 1}
dataset$_j$={512, 10, 5}
dataset$_k$={512, 20, 1}
dataset$_l$={512, 20, 5}
dataset$_m$={512, 30, 1}
dataset$_n$=[512, 30, 5}
dataset$_o$={256, 10, 1}
dataset$_p$={256, 10, 5}
dataset$_q$={256, 20, 1}
dataset$_r$={256, 20, 5}
dataset$_s$={256, 30, 1}
dataset$_t$=[256, 30, 5}

These parameter codes can be appended or otherwise incorporated into the computer requests from a training trial scheduling function. The HPO engine 101 can respond to the computer requests by decoding the self-identifying parameter codes. Each such request can be decoded to identify the next dataset's parameter code, and to determine whether or not to extract the next dataset from the set of sample data 202.

FIG. 5 illustrates the use of a computer queue 224 to control the ordering of the scheduled training trials, consistent with illustrative embodiments. From decoding the scheduling requests, the queue 224 can index each dataset 214 to its corresponding parameter code 226 and a sequence order 228. A packing policy can be enforced that maintains like datasets in sequential order. For example, the scheduled order out of the queue 224, as depicted in FIG. 5, begins with eight of the same dataset$_s$ (dataset$_{i1}$-dataset$_{i8}$), followed by three of the same datasets (dataset$_{j1}$-dataset$_{j3}$), followed by seven of the same datasets (dataset$_{k1}$-dataset$_{k7}$).

Figure 6:
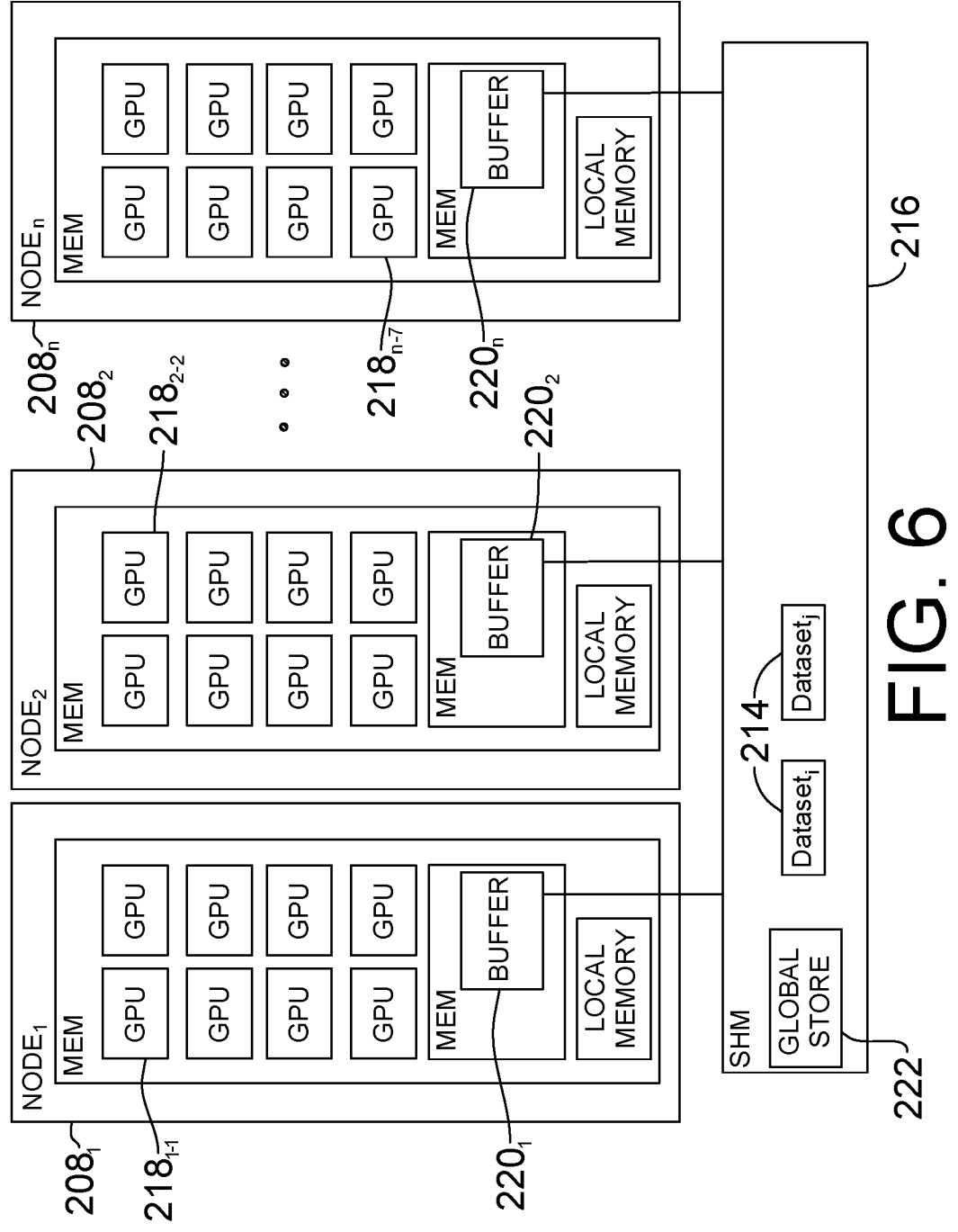
FIG. 6 depicts multiple multiprocessing nodes with each having graphics processing units ("GPUs") to run high-speed parallel training trials, consistent with illustrative embodiments.

FIG. 6 depicts the scheduled training trials supplied by these ordered dataset$_s$ 214 can be performed in three or more multiprocessing nodes 208$_1$, 208$_2$, 208$_3$ that share the computer memory 216 (FIG. 4), consistent with illustrative embodiments. In this example, each of the nodes 208 can have eight GPUs. By dedicating each GPU to an individual training trial, up to 24 parallel training trials can be run with three multiprocessing nodes 208. Each of the nodes 208 can include a buffer 220 to locally store one or more of the datasets 214. In this example, two datasets (dataset$_i$ and dataset$_j$) have been stored in the shared memory 216, by the CPU 110 or a node 208. The nodes 208 can get datasets 214 from the shared memory 216 and buffer them locally. A global store can index virtual and physical locations of all the datasets 214 stored in computer memory.

Figure 7:
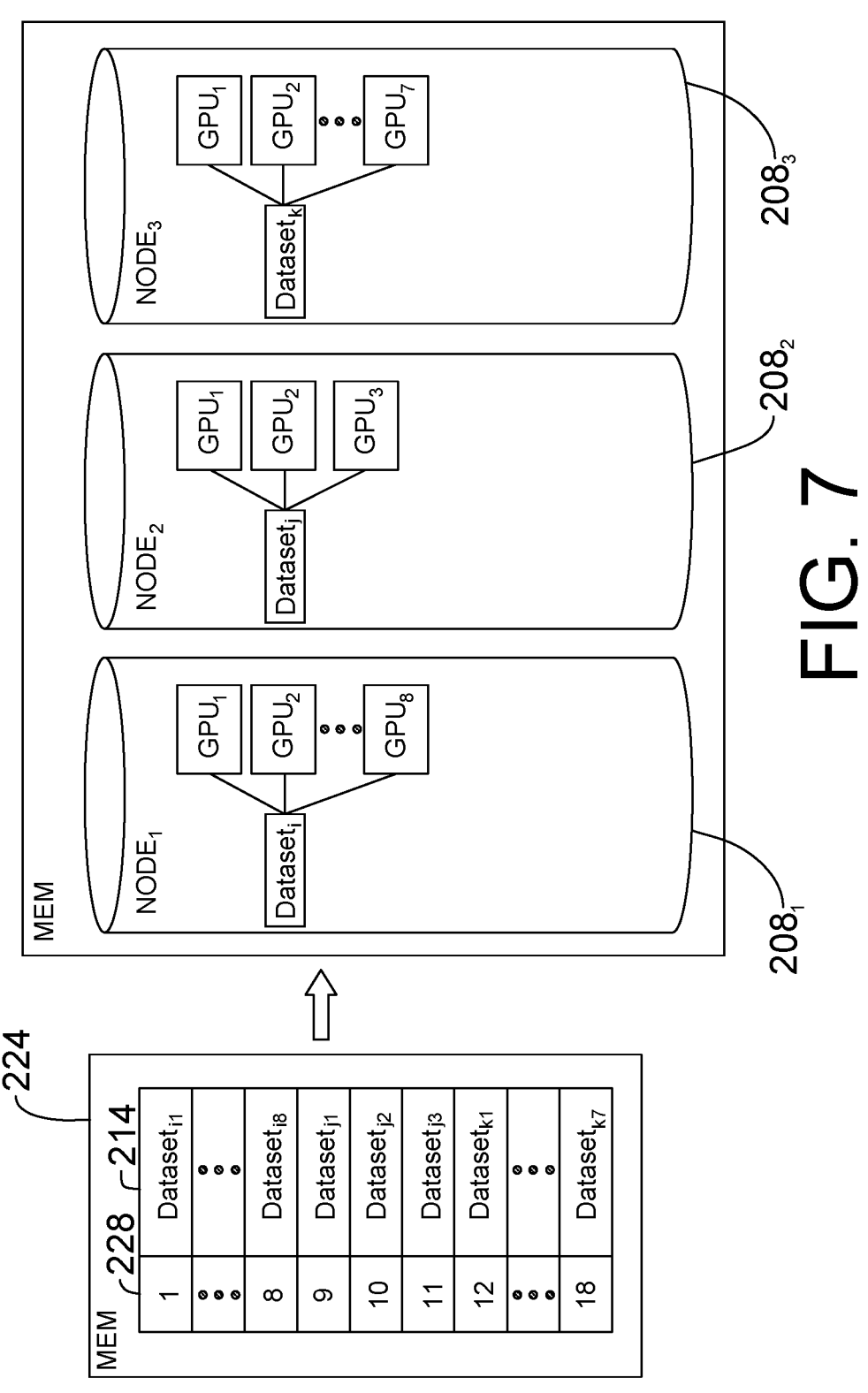
FIG. 7 is a conceptual block diagram depicting multiprocessing nodes that are each dedicated to running training trials with the same dataset, consistent with illustrative embodiments.

FIG. 7 depicts the scheduled order out of the queue 224 can effectively dedicate each node 208 to only running training trials with datasets having the same parameter code, consistent with illustrative embodiments. That is, the eight training trials with dataset$_i$ are ordered to the eight GPUs in the first node 208$_1$. Similarly, the three training trials with dataset$_j$ are ordered to the second node 208$_2$, and the seven training trials with dataset$_k$ are ordered to the third node 208$_3$. This approach aims to minimize the validation loss of the ML model while also maximizing the similarity of the data parameter datasets among all training trials running in the same node 208. That can be beneficial when performing more predictable, expansive learning throughout the domain space, such as in grid-based optimizations, in which such ordering is more likely render all the nodes 208 highly utilized.

Figure 8:
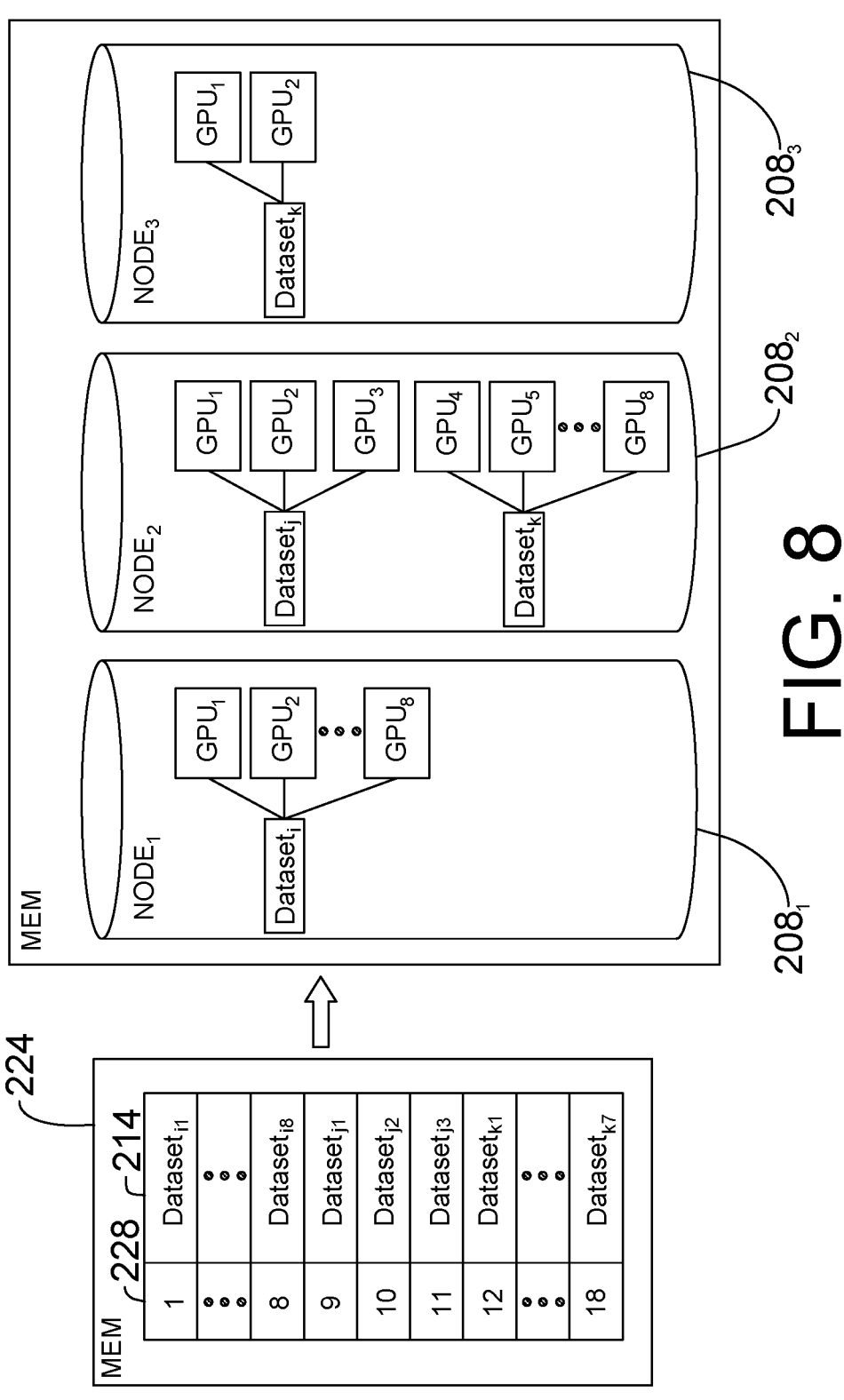
FIG. 8 is a conceptual block diagram depicting a multiprocessing node running training trials with different datasets, consistent with illustrative embodiments.

But in more sparse searching such as random and Bayesian optimizations, the ordering of training trials in FIG. 7 can result in one or more of the dedicated nodes 208 becoming poorly utilized. FIG. 8 depicts an alternative scheduled order out of the queue 224 that runs training trials with datasets having different parameter codes, consistent with illustrative embodiments. Like before, all eight of the training trials with dataset$_i$ are ordered to the first node 208$_1$, advantageously utilizing the first node 208$_1$ 100%. And also like before, all three of the training trials with dataset$_j$ are ordered to the second node 208$_2$. But five of the training trials with dataset$_k$ in FIG. 8 are also ordered to the second node 208$_2$. That puts the utilization of both first and second nodes 208 to 100%, maximizing the total number of fully utilized nodes 208. The stacking policies can function to maintain grouping of like datasets as feasible. For example, in FIG. 3 the ordering can re-prioritize in favor of dataset$_k$ being the next dataset to extend the last grouping in the third node 208$_3$.

Figure 9:
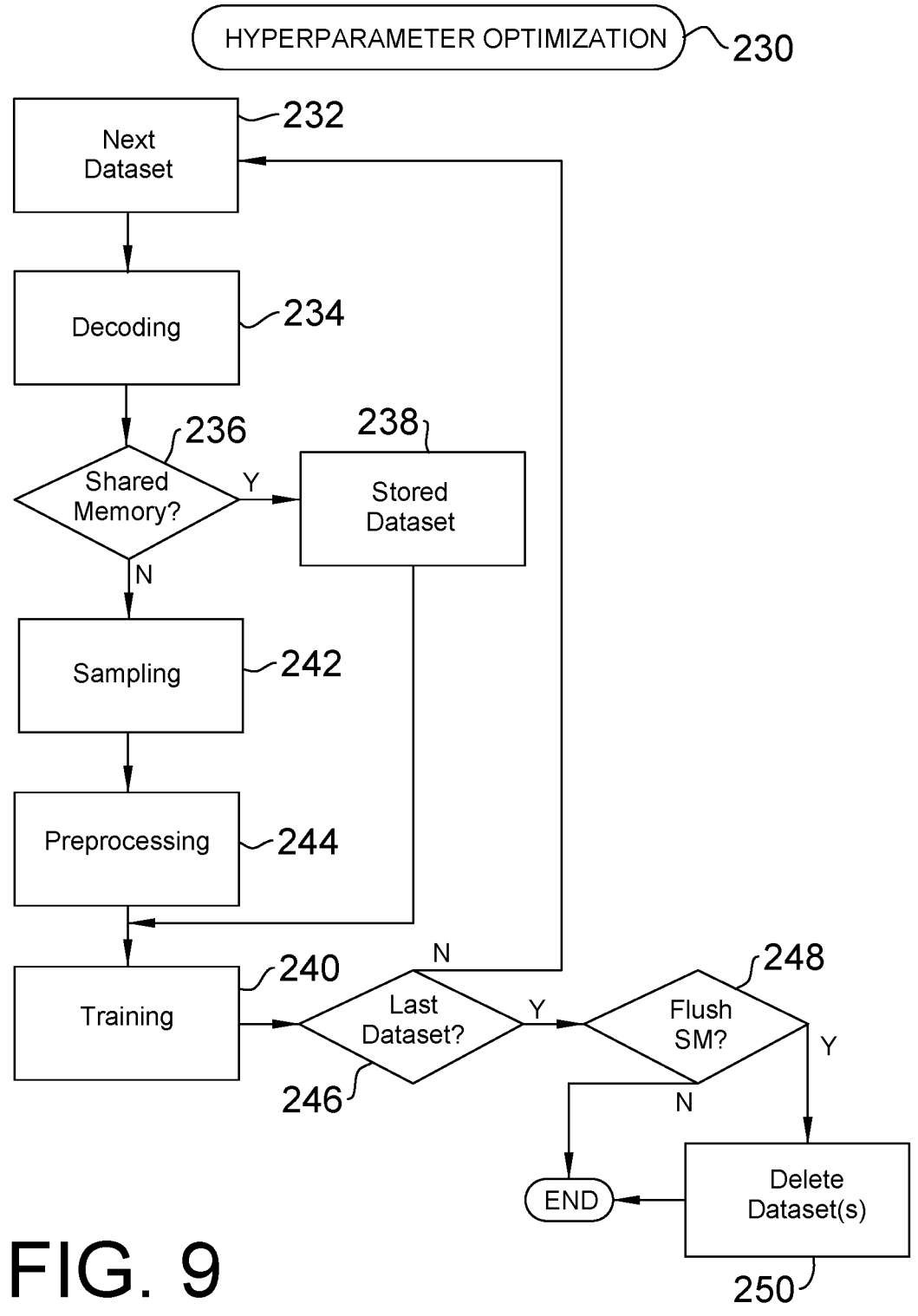
FIG. 9 is a flowchart depicting steps in a method for hyperparameter optimization, consistent with illustrative embodiments.

FIG. 9 is a flowchart depicting steps in a method 230 of hyperparameter optimization, consistent with illustrative embodiments. The method 230 can begin in block 232 by the HPO engine receiving a computer request for a scheduled training trial. In block 234, the HPO engine responds by decoding the parameter code embedded in or referenced by the computer request. This identifies the next dataset in a set of sample data stored in one or more local or remote computer memories.

In block 236, the HPO engine can query the shared memory to determine whether the next dataset is stored there. If block 236 determines the next dataset is stored in the shared memory, then in block 238 the HPO engine can respond to the scheduling request by supplying the next dataset that is stored in the shared memory. The scheduled training trial can then be run in block 240. But if the block 236 determines the next dataset is not stored in the shared memory, then control passes to block 242 for sampling the next dataset from the set of sampled data and to block 244 for preprocessing the newly sampled dataset. The scheduled training trial can then be run in block 240.

Block 246 determines whether the last scheduled training trial has been run. If not, control returns to block 232 to receive the next computer request. However, if the last training trial has been run, then block 248 can selectively flush the shared memory and buffers in block 250, such as according to established policies freeing up computer memory by deleting stale data.

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

It is to be appreciated that the computer system (e.g., the specialized computer 102, the HPO block 101, and/or the processing resources) performs acts in optimizing machine learning that cannot be performed by a human (e.g., is greater than the capability of a single human mind). For example, an amount of data processed, a speed of processing of data and/or data types of the data processed over a certain period of time can be greater, faster and different than an amount, speed and data type that can be processed by a single human mind over the same period of time. The computer system can also be fully operational towards performing one or more other functions while also performing the above-referenced hyperparameter optimization of an ML model. Moreover, ML output generated by computer system can include information that is impossible to obtain manually by a user. For example, an amount of information included in the ML output and/or a variety of information included in the ML output can be more complex than information obtained manually by a user.

Moreover, because at least machine learning optimization is established from a combination of electrical and mechanical components and circuitry, a human is unable to replicate or perform processing performed by the computer system (e.g., specialized computer 102, the HPO block 101, resources) disclosed herein. For example, a human is unable to communicate data and/or process data associated with the HPO block 101 for a given downstream task.

Additionally, the specialized computer 102 significantly improves the operating efficiencies of the computer system by identifying and processing training samples corresponding to different hyperparameter constraints in response to a downstream task. Transmitting custom-tailored hyperparameter training samples to a shared memory as disclosed herein intentionally and significantly eliminates the need to transmit larger volumes of the test data and eliminates multiple processing and copying of the training datasets. This frees up computer system processing overhead and storage capacities to attend to more important processes, generally reducing the overall computational overhead of hyperparameter optimization.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed:

1. A computer-implemented method for supplying data domain datasets in machine training trials, the computer-implemented method comprising:
   decoding a parameter code in a computer request for a training trial of the machine training trials, to identify a next dataset in a set of sample data stored in a first computer memory, wherein the parameter code corresponds to one or more predetermined data domain hyperparameter values of the next dataset;
   responding to the computer request for the training trial by determining whether the next dataset is available in a second computer memory;
   in a case where the next dataset is available in the second computer memory, supplying the next dataset that is available in the second computer memory; and
   in a case where the next dataset is not available in the second computer memory, supplying the next dataset from the set of sample data.

2. The computer-implemented method of claim 1, wherein the one or more predetermined data domain hyperparameter values comprise at least one data domain hyperparameter value comprising a window size, a patch length, or a stride.

3. The computer-implemented method of claim 1, further comprising:
   encoding the next dataset, sampled from the set of sample data, with the parameter code; and
   storing the encoded next dataset to the second computer memory.

4. The computer-implemented method of claim 1, wherein the supplying of the next dataset from the set of sample data comprises:
   extracting the next dataset from the set of sample data stored in the first computer memory;
   transforming the next dataset into a training sample for performing the training trial; and
   loading the next dataset with scheduled datasets, of the data domain datasets, into a predetermined order of the machine training trials.

5. The computer-implemented method of claim 4, wherein the transforming comprises at least one computer process comprising resizing images, decoding videos, or data augmentation.

6. The computer-implemented method of claim 4, wherein the transforming comprises batching together domain features and labels of the next dataset.

7. The computer-implemented method of claim 4, wherein the second computer memory is shared between a central processing node and a multiprocessing node to perform the machine training trials in parallel in the predetermined order.

8. The computer-implemented method of claim 7, wherein the predetermined order runs the machine training trials in parallel in the multiprocessing node with datasets, of the data domain datasets, corresponding to a same parameter code to optimize a similarity of the datasets in the multiprocessing node.

9. The computer-implemented method of claim 7, wherein the predetermined order runs the machine training trials in parallel in the multiprocessing node with datasets, of the data domain datasets, having different parameter codes to optimize a utilization of the multiprocessing node.

10. The computer-implemented method of claim 7, wherein:
   the second computer memory is shared between the central processing node and a plurality of multiprocessing nodes;

the predetermined order runs the machine training trials in parallel with datasets, of the data domain datasets, having a same parameter code in at least one multiprocessing node of the plurality of multiprocessing nodes; and the predetermined order runs the machine training trials in parallel with datasets, of the data domain datasets, having different parameter codes in the at least one multiprocessing node of the plurality of multiprocessing nodes.

11. The computer-implemented method of claim 1, further comprising selectively deleting the next dataset from the second computer memory.

12. A computer program product for supplying data domain datasets in machine training trials, the computer program product comprising a computer readable storage medium having program instructions embodied therewith, wherein the program instructions, when executed by a computer processor, cause the computer processor to:

decode a parameter code in a computer request for a training trial of the machine training trials, to identify a next dataset in a set of sample data stored in a first computer memory, wherein the parameter code corresponds to one or more predetermined data domain hyperparameter values of the next dataset;

respond to the computer request for the training trial by determining whether the next dataset is available in a second computer memory;

in a case where the next dataset is available in the second computer memory, supplying the next dataset that is available in the second computer memory; and in a case where the next dataset is not available in the second computer memory, supplying the next dataset from the set of sample data.

13. The computer program product of claim 12, wherein the program instructions further cause the computer processor to:

encode the next dataset, sampled from the set of sample data, with the parameter code; and store the encoded next dataset to the second computer memory.

14. The computer program product of claim 13, wherein the program instructions further cause the computer processor to share the second computer memory between a central processing node and a multiprocessing node to perform the machine training trials in parallel in a predetermined order.

15. The computer program product of claim 14, wherein the program instructions further cause the computer processor to run the machine training trials in parallel in the multiprocessing node with datasets, of the data domain datasets, having a same parameter code according to the predetermined order to optimize a similarity of the datasets in the multiprocessing node.

16. The computer program product of claim 14, wherein the program instructions further cause the computer processor to run the machine training trials in parallel in the multiprocessing node with datasets, of the data domain datasets, having different parameter codes according to the predetermined order to optimize a utilization of the multiprocessing node.

17. The computer program product of claim 14, wherein:

the program instructions further cause the computer processor to share the second computer memory between the central processing node and a plurality of multiprocessing nodes;

the predetermined order runs the machine training trials in parallel with datasets, of the data domain datasets, having a same parameter code to optimize a similarity of the datasets in at least one multiprocessing node of the plurality of multiprocessing nodes; and the predetermined order runs the machine training trials in parallel with datasets, of the data domain datasets, having different parameter codes to optimize a utilization of the at least one multiprocessing node of the plurality of multiprocessing nodes.

18. The computer program product of claim 14, wherein the program instructions further cause the computer processor to selectively delete the next dataset from the second computer memory.

19. A computer system for supplying data domain datasets in machine training trials, the computer system having a processor, a computer-readable memory, a computer-readable tangible storage device, and program instructions stored on the computer-readable tangible storage device for execution by the processor via the computer-readable memory, wherein the computer system is configured to perform:

decoding a parameter code in a computer request for a training trial of the machine training trials, to identify a next dataset in a set of sample data stored in a first computer memory, wherein the parameter code corresponds to one or more predetermined data domain hyperparameter values of the next dataset;

responding to the computer request for the training trial by determining whether the next dataset is available in a second computer memory;

in a case where the next dataset is available in the second computer memory, supplying the next dataset that is available in the second computer memory; and in a case where the next dataset is not available in the second computer memory, supplying the next dataset from the set of sample data.

* * * * *